(12) United States Patent
Adams et al.

(10) Patent No.: US 12,231,217 B2
(45) Date of Patent: Feb. 18, 2025

(54) COMMUNICATIONS NETWORK

(71) Applicant: BAE SYSTEMS PLC, London (GB)

(72) Inventors: Alexander Luke Adams, Bournemouth (GB); James Miller, Bournemouth (GB); Philip James Marchant, Bournemouth (GB); Adrian Lambert, Bournemouth (GB)

(73) Assignee: BAE SYSTEMS PLC, London (GB)

( * ) Notice: Subject to any disclaimer, the term of this patent is extended or adjusted under 35 U.S.C. 154(b) by 59 days.

(21) Appl. No.: 18/009,570

(22) PCT Filed: Jun. 7, 2021

(86) PCT No.: PCT/GB2021/051407
§ 371 (c)(1),
(2) Date: Dec. 9, 2022

(87) PCT Pub. No.: WO2021/250385
PCT Pub. Date: Dec. 16, 2021

(65) Prior Publication Data
US 2023/0246702 A1  Aug. 3, 2023

(30) Foreign Application Priority Data
Jun. 11, 2020 (EP) ..................................... 20275107
Jun. 11, 2020 (GB) ..................................... 2008872

(51) Int. Cl.
*H04B 7/15* (2006.01)
*H04B 7/155* (2006.01)
*H04B 7/26* (2006.01)

(52) U.S. Cl.
CPC ....... *H04B 7/15528* (2013.01); *H04B 7/2606* (2013.01)

(58) Field of Classification Search
CPC ........................... H04B 7/15528; H04B 7/2606
(Continued)

(56) References Cited

U.S. PATENT DOCUMENTS 9,836,049 B1   12/2017  Tu
11,190,952 B2* 11/2021  Suzuki ............... H04B 7/18506
(Continued)

FOREIGN PATENT DOCUMENTS

GB   2532966 A  *  6/2016  ............. B64C 39/02
WO   2019084081 A2   5/2019

OTHER PUBLICATIONS

Park, Jongho et al., "Landing Site Searching and Selection Algorithm Development Using Vision System and Its Application to Quadrotor", IEEE Transactions on Control Systems Technology (Mar. 2015), vol. 23, No. 2, pp. 488-503.

(Continued)

*Primary Examiner* — Emmanuel Bayard
(74) *Attorney, Agent, or Firm* — Scully, Scott, Murphy & Presser, P.C.

(57) ABSTRACT

An unmanned vehicle (20) for relaying radio frequency signals in a tactical communications network is described. The unmanned vehicle comprises a processor (22) arranged to receive the location of a first asset (40*a*); select a relay site (30) from at least one relay site; and control the unmanned vehicle to move to the selected relay site, wherein at the selected relay site, communication between the first asset and the unmanned vehicle is enabled. The unmanned vehicle also comprises a receiver for receiving data from the first asset; and a transmitter for transmitting the data to a second asset (40*b*, 20, 10). A control unit (60) for an unmanned vehicle, a tactical communications network comprising a plurality of unmanned vehicles, and a method of relaying signals in a tactical communications network using an unmanned vehicle are all also described.

20 Claims, 7 Drawing Sheets

(58) Field of Classification Search
USPC .......................................................... 375/262
See application file for complete search history.

(56) References Cited

U.S. PATENT DOCUMENTS

| 11,923,957 | B2* | 3/2024 | De Rosa ............... B64C 39/024 |
| 2017/0111102 | A1* | 4/2017 | Fan ....................... H04W 4/023 |
| 2017/0242431 | A1* | 8/2017 | Dowlatkhah ...... H04B 7/18504 |
| 2018/0299892 | A1* | 10/2018 | Brooks ................ G08G 5/0069 |
| 2019/0028546 | A1 | 1/2019 | Ranasinghe et al. |
| 2019/0115974 | A1 | 4/2019 | Frolov et al. |
| 2020/0128359 | A1 | 4/2020 | Patil et al. |
| 2020/0225685 | A1* | 7/2020 | Li .......................... G05D 1/101 |

OTHER PUBLICATIONS

Popek, Katie M. et al., "Autonomous Grasping Robotic Aerial System for Perching (AGRASP)", 2018 IEEE/RSJ International Conference on Intelligent Robots and Systems (IROS) Madrid, Spain, Oct. 1-5, 2018, pp. 6220-6225.
Wang, P. F. et al., "Offline Perching Location Selection for Quadrotor UAV in Urban Environment", 12th IEEE International Conference on Control & Automation (ICCA) Kathmandu, Nepal, Jun. 1-3, 2016, pp. 1008-1013.
International Search Report dated Aug. 11, 2021 issued in PCT/GB2021/051407.
GB Search Report dated Nov. 25, 2020 issued in GB 2008872.0.
Extended European Search Report dated Nov. 6, 2020 issued in EP 20275107.9.

* cited by examiner

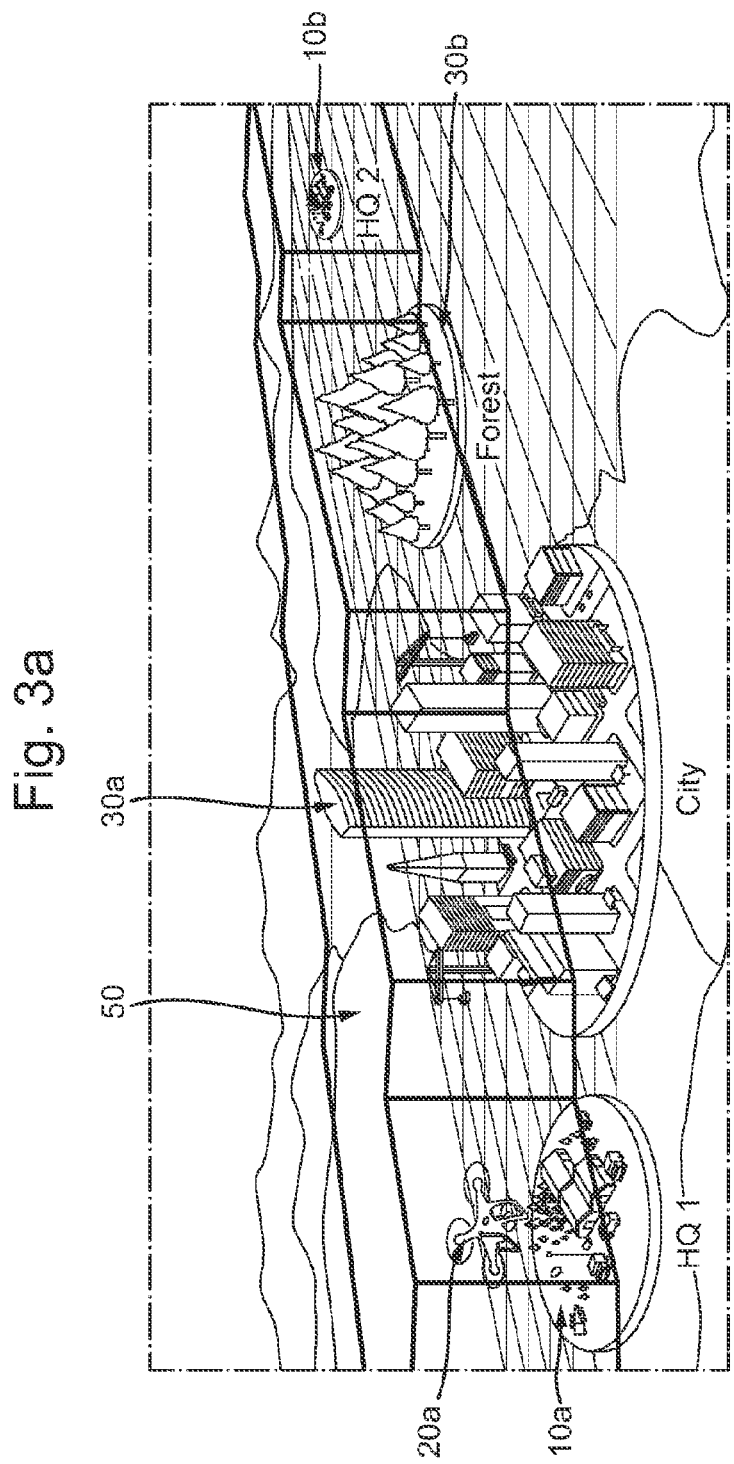

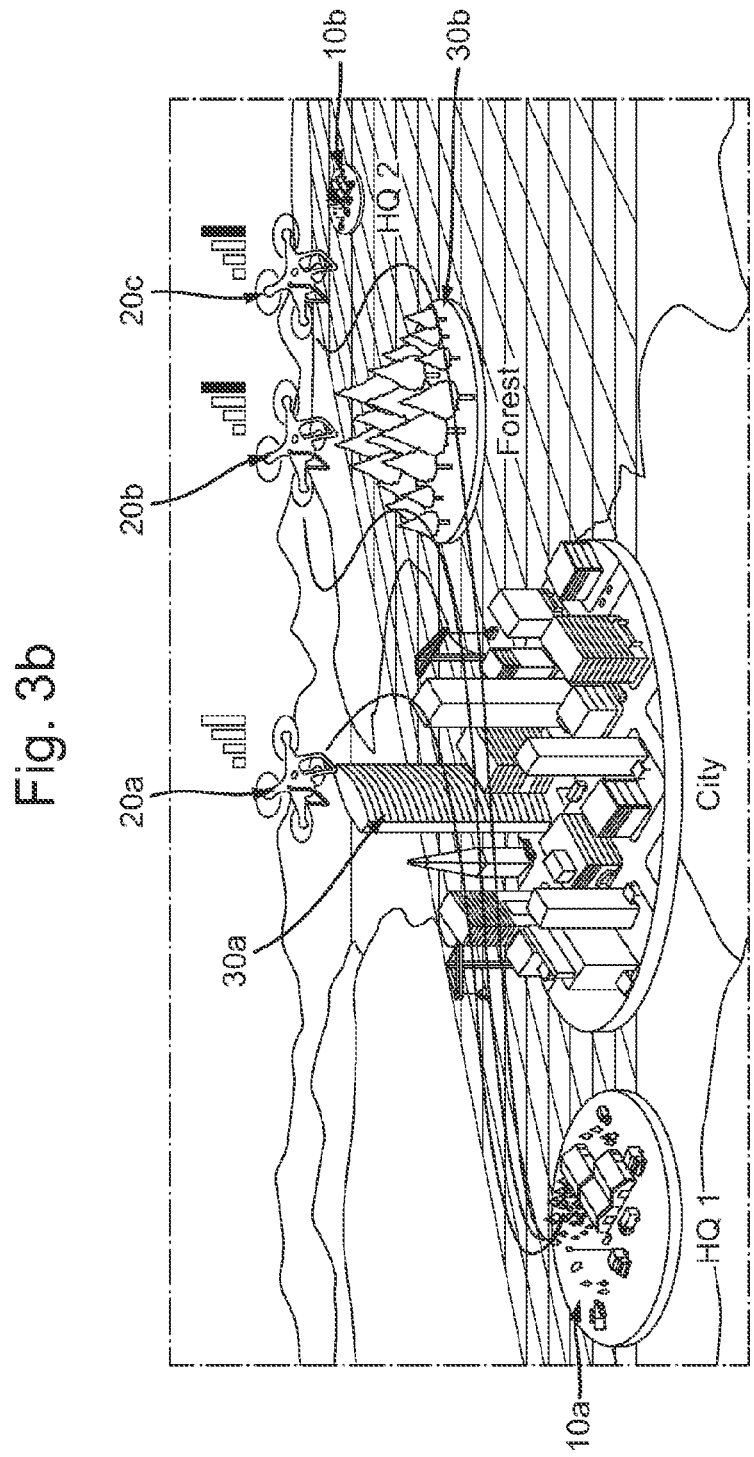

COMMUNICATIONS NETWORK

FIELD

The present disclosure relates to an unmanned vehicle, particularly an unmanned vehicle for relaying radio frequency signals in a tactical communications network. The present disclosure also relates to a control unit for an unmanned vehicle, a tactical communications network comprising unmanned vehicles, and a method of relaying signals in a tactical communications network using an unmanned vehicle.

BACKGROUND

In battlefield environments, it can be challenging to maintain communications links between fighting units and other assets such as command and control centres (such as divisional headquarters) or intelligence gathering units. It is known to use the fighting units themselves, for example mechanised infantry vehicles, to piggyback voice or data signals within a tactical communications network and thereby act as network nodes. However, positioning such a unit in an optimal location to support the communications network reduces the unit's combat effectiveness. It is also known to insert specialised communications units into the battlefield environment to maintain communications links between other assets; however, these specialised communications units need to be protected by fighting units and cannot be placed in locations that optimise the network or they may risk being exposed to the enemy.

Therefore, there is a need to reduce resource and logistical burden in deploying a tactical communications network.

SUMMARY

According to a first aspect of the present disclosure, there is provided an unmanned vehicle for relaying radio frequency signals in a tactical communications network, the unmanned vehicle comprising: a processor arranged to: receive the location of a first asset; select a relay site from at least one relay site; and control the unmanned vehicle to move to the selected relay site, wherein at the selected relay site, communication between the first asset and the unmanned vehicle is enabled; a receiver for receiving data from the first asset; and a transmitter for transmitting the data to a second asset.

Advantageously, the unmanned vehicle acts as a relay which reduces the resource and logistical burden required to deploy tactical communications networks, as the unmanned vehicle is able to autonomously determine a location to deploy to in order to provide an optimal communications capability and thereby minimises threat to personnel.

The processor may be configured to identify the at least one relay site. Identifying the at least one relay site may comprise determining coordinates associated with the at least one relay site. The processor may be arranged to receive coordinates associated with the at least one relay site.

The unmanned vehicle may comprise storage means arranged to store a set of conditions, and the processor may be configured to receive object data relating to the at least one relay site and compare the data against the conditions to select the relay site. The object data may comprise mapping data, terrain data, architectural data, image data and/or atmospheric data. The processor may select the relay site based on which of a plurality of relay sites matches the most stored conditions. Alternatively, the conditions may be ranked, such that relay sites matching higher-ranked conditions are selected over those matching perhaps more lower-ranked conditions. The set of conditions may comprise landing conditions, such as a maximum cross-wind velocity. The conditions may comprise data relating to the shape, size, elevation or angle of the at least one relay site. The conditions may comprise the RF signal strength received at the relay site. The conditions may comprise minimum or maximum threshold values. The unmanned vehicle may be arranged to exchange data with a server comprising the conditions in order to perform the comparison.

The unmanned vehicle may comprise an imaging device configured to capture at least one image of the at least one relay site, wherein the received data relates to the shape, configuration and/or elevation of the at least one relay site. The imaging device may be a LIDAR device, optical camera, synthetic aperture radar, or the like. The data may comprise the curvature, diameter, surface area, gradient, and/or elevation of a surface of the relay site. The unmanned vehicle may also comprise a sensor for measuring wind speed at the at least one relay site, wherein the data comprises the wind speed.

The processor may be configured to calculate or predict a signal strength of a signal comprising the data received from the first asset and/or the second asset at the at least one relay site and to use the determined or predicted signal strength to select the relay site.

The processor may be configured to determine the elevation of the at least one relay site, receive transmission characteristics of the first asset and/or second asset, and use the elevation and transmission characteristics to predict the signal strength of a signal virtually received at the at least one relay site.

The processor may be configured to generate control signals to control the unmanned vehicle to move to the at least one relay site, the receiver may be arranged to receive a signal from the first asset and/or second asset while the unmanned vehicle is positioned at the at least one relay site, and the processor may be further configured to analyse the received signal to calculate the received signal strength. There may be a plurality of relay sites, and calculating the signal strength may comprise moving the unmanned vehicle to each of the plurality of relay sites in turn.

Determining or predicting the signal strength may comprise determining if a radio frequency line of sight is/would be available between the first and/or second asset and the unmanned vehicle at the respective relay site. A radio frequency line of sight may be available if a throughput greater than threshold throughput can be maintained between the unmanned vehicle and the first and/or second asset. Calculating the signal strength may comprise calculating a signal-to-noise ratio or a signal quality.

The processor may be configured to determine or receive the location of a geographical region, wherein the geographical region comprises the relay sites, and the processor may be configured to generate a control signal to move the unmanned vehicle to the geographical region. The signal may be received directly or indirectly from the control unit. The control unit may be a fixed control station, a control vehicle or another unmanned vehicle according to the first aspect. The signal may be relayed to the unmanned vehicle via another unmanned vehicle according to the first aspect. The geographical region may comprise a plurality of relay sites. The geographical region may be the coordinates of a relay site. The geographical region may be any area where a signal can be received from the first asset and/or the second asset above a threshold signal strength. The geographical region may be a channel, such as an airspace channel, between the first asset and the second asset. The location of the geographical region may be determined by a control unit and received by the unmanned vehicle via the receiver.

The processor may be configured to measure the signal strength of a signal received from the first asset, while the unmanned vehicle is moving through the region towards the second asset, and select a relay site in the vicinity of the position where the received signal strength drops below a threshold signal strength, or wherein the processor is configured to measure the signal strength of a signal received from the second asset, while the unmanned vehicle is moving through the region towards the second asset, and select a relay site in the vicinity of the position where the received signal strength exceeds a threshold signal strength.

The vicinity may be an area with a radius of up to 1000 metres from the position. The vicinity may be an area with a radius of up to 500 metres from the position. The vicinity may be an area with a radius of up to 100 metres from the position. The vicinity may be an area with a radius of up to 25 metres from the position. The selected relay site may be the closest relay site to the position.

The processor may be configured to: determine the locations of the first asset and/or the second asset; determine the transmit and/or receive capability of the first asset and/or the second asset; and use the determined locations and transmit and/or receive capability to identify the at least one relay site.

The unmanned vehicle may be an unmanned aerial vehicle, and moving the unmanned vehicle to the selected relay site may comprise landing the unmanned vehicle on the selected relay site.

The unmanned vehicle may comprise securing means configured to, when actuated, grip the selected relay site in order to secure the unmanned vehicle to it to facilitate landing. The securing means may be powered. The securing means may comprise pincers, a grab or claw.

The processor may be configured to generate health data relating to the unmanned vehicle and the transmitter may be arranged to transmit the health data to a control unit. The receiver may be arranged to receive health data, and the processor may be arranged to use the health data to move the unmanned vehicle to a new region.

According to a second aspect of the present disclosure, there is provided a control unit for an unmanned vehicle for relaying radio frequency signals in a tactical communications network, the control unit comprising: a processor configured to: determine a location of a first asset and a second asset; use the location of the first asset and the second asset to determine the location of a geographical region in which to place a relay to enable communication between the first asset and the second asset; generate a control signal comprising an instruction to move an unmanned vehicle according to the first aspect to the geographical region; and a transmitter configured to transmit the control signal to the unmanned vehicle.

The processor may be configured to: retrieve mapping data comprising the elevation of a plurality of relay sites in the geographical region, and select a relay site providing radio frequency line of sight to the first asset and/or the second asset, wherein the control signal comprises an instruction for the unmanned vehicle to move to and/or land on the selected relay site.

The processor may be configured to: predict a signal strength of a signal received from the first asset and/or second asset while the unmanned vehicle is virtually positioned at each of the relay sites, and select the relay site providing the highest signal strength, wherein the control signal comprises an instruction for the unmanned vehicle to move to and/or land on the selected relay site.

The processor may be configured to receive situational awareness data and/or health data relating to a plurality of unmanned vehicles and generate a control signal comprising instructions to redistribute the plurality of unmanned vehicles based on the situational awareness data and/or health data.

According to a third aspect of the present disclosure, there is provided a tactical communications network comprising a plurality of unmanned vehicles according to the first aspect, wherein the tactical communications network is a self-healing mesh network comprising a processor configured to determine a respective geographical region for each one of the plurality of unmanned vehicles to move to in order to provide radio frequency line of sight between assets in the network.

According to a fourth aspect of the present disclosure, there is provided a method of relaying signals in a tactical communications network using an unmanned vehicle, the method comprising: receiving the location of a first asset; selecting a relay site from at least one relay site; and controlling the unmanned vehicle to move to the selected relay site, wherein at the selected relay site, communication between the first asset and the unmanned vehicle asset is enabled; receiving data from the first asset at a receiver of the unmanned vehicle; and transmitting the data to the second asset using a transmitter of the unmanned vehicle.

The method may comprise storing a set of conditions, and receiving object data relating to the at least one relay site and comparing the object data against the conditions to select the relay site. The object data may comprise mapping data, terrain data, architectural data, image data and/or atmospheric data. The method may comprise determining which of a plurality of relay sites matches the most stored conditions to select the relay site based. Alternatively, the conditions may be ranked, such that relay sites matching higher-ranked conditions are selected over those matching perhaps more lower-ranked conditions. The set of conditions may comprise landing conditions, such as a maximum crosswind velocity. The conditions may comprise data relating to the shape, size, elevation or angle of the at least one relay site. The conditions may comprise the RF signal strength received at the relay site. The conditions may comprise minimum or maximum threshold values. The method may comprise exchanging data with a server comprising the conditions in order to perform the comparison.

The method may comprise capturing at least one image of the at least one relay site, wherein the received data relates to the shape, configuration and/or elevation of the at least one relay site. The method may comprise measuring a wind speed at the at least one relay site.

The method may comprise calculating or predicting a signal strength of a signal comprising the data received from the first asset and/or second asset at the at least one relay site and using the calculated or predicted signal strength to select the relay site. Calculating or predicting a signal strength may comprise determining whether a radio frequency line of sight is available between the first asset and/or second asset and the unmanned vehicle when it is at the at least one relay site.

Predicting the signal strength comprises determining the elevation of the relay sites, receiving transmission characteristics of the first asset and/or second asset, and using the elevation and transmission characteristics to calculate the signal strength of a signal virtually received at least one relay site.

Calculating the signal strength may comprise: moving the unmanned vehicle to the at least one relay site; receiving a signal from the first asset and/or second asset while the unmanned vehicle is positioned at the at least one relay site; and analysing the received signal to calculate the received signal strength. There may be a plurality of relay sites, and calculating the signal strength may comprise moving the unmanned vehicle to each of the plurality of relay sites in turn.

The method may comprise determining or receiving the location of a geographical region, wherein the geographical region comprises the at least one relay site, and the method may further comprise generating a control signal to move the unmanned vehicle to the geographical region. The geographical region may comprise a plurality of relay sites. The geographical region may be the coordinates of a relay site. The geographical region may be an area where a signal can be received from the first asset and/or the second asset above a threshold signal strength. The geographical region may be a channel between the first asset and the second asset. The method may comprise receiving the location of the geographical region from a control unit.

The method may comprise:
  measuring the signal strength of a signal received from the first asset, while the unmanned vehicle is moving through the region towards the second asset, and selecting a relay site in the vicinity of the position where the received signal strength drops below a threshold signal strength, or
  measuring the signal strength of a signal received from the second asset, while the unmanned vehicle is moving through the region towards the second asset, and selecting a relay site in the vicinity of the position where the received signal strength exceeds a threshold signal strength.

The vicinity may be an area with a radius of up to 1000 metres from the position. The vicinity may be an area with a radius of up to 500 metres from the position. The vicinity may be an area with a radius of up to 100 metres from the position. The vicinity may be an area with a radius of up to 25 metres from the position. The selected relay site may be the closest relay site to the position.

The method may comprise:
  determining the locations of the first asset and/or the second asset;
  determining the transmit and/or receive capability of the first asset and/or the second asset; and
  using the determined locations and transmit and/or receive capability to identify the at least one relay site.

The unmanned vehicle may be an unmanned aerial vehicle, and moving the unmanned vehicle to a selected relay site may comprise landing the unmanned vehicle on the selected relay site.

The method may comprise actuating a securing device to grip the selected relay site in order to secure the unmanned vehicle to it in order to facilitate landing. The securing device may be powered. The securing device may comprise pincers, a grab or claw.

The method may comprise generating health data relating to the unmanned vehicle and transmitting the health data to a control unit. The method may comprise receiving health data and using it to move the unmanned vehicle to a new region.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the disclosure will now be described by way of example only and with reference to the accompanying drawings, in which:

FIGS. 3a and 3b are system diagrams illustrating how a tactical communications network is deployed;

For convenience and economy, the same reference numerals are used in different figures to label identical or similar elements.

DETAILED DESCRIPTION

Figure 1:
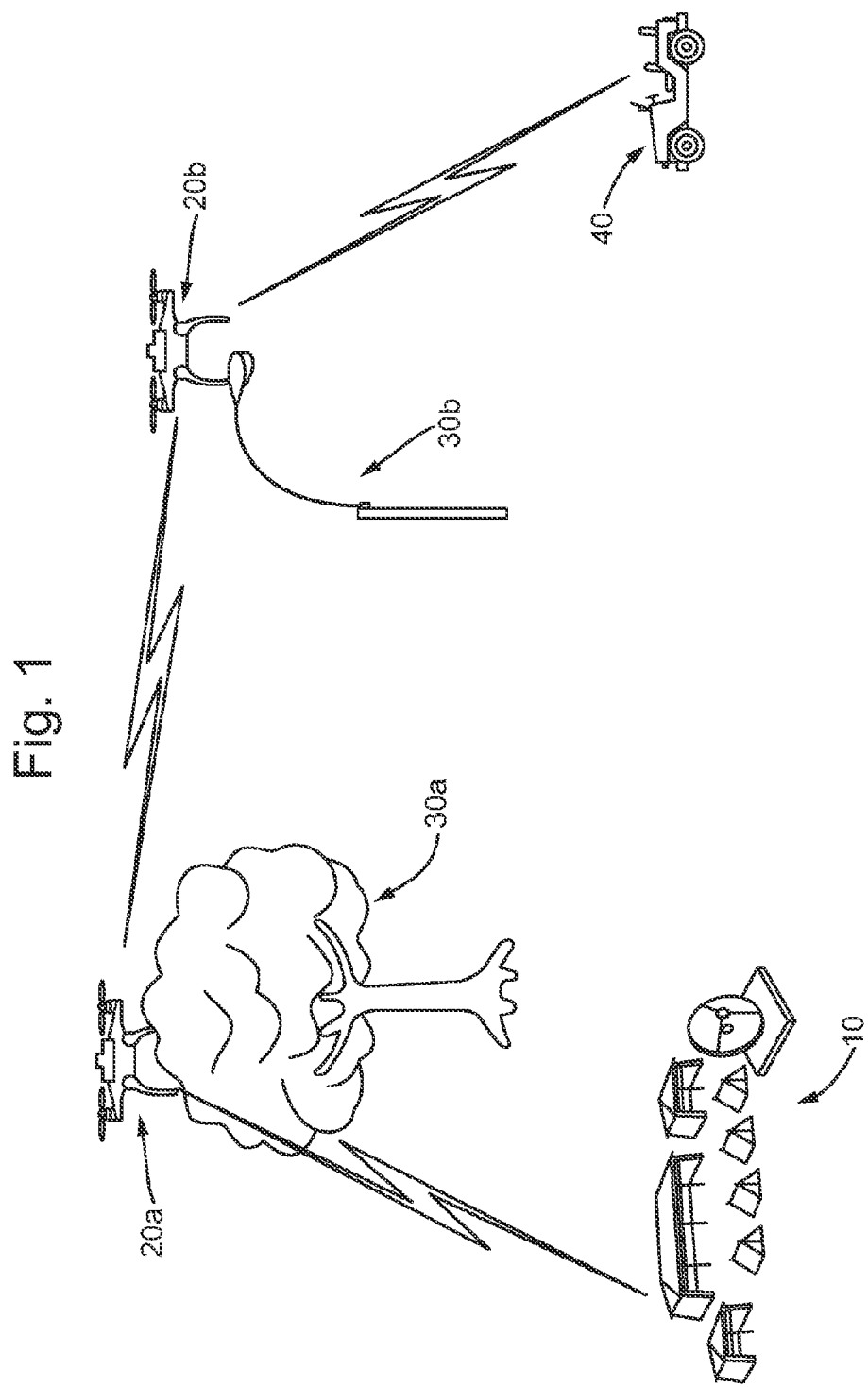
FIG. 1 is a system diagram of a deployed tactical communications network.

Generally, embodiments herein relate to unmanned vehicles arranged to seek out and autonomously travel to optimal vantage points from which to act as nodes in a deployed tactical communications network. The unmanned vehicles are preferably unmanned aerial vehicles designed to perch on tall objects such as lampposts, buildings and hilltops, optionally using bespoke securing means, to conserve energy. The unmanned vehicles may then be redeployed as assets making use of the communications network move or the environment/situation changes. In other words, in preferred embodiments the unmanned vehicles (relay nodes) redeploy dynamically and autonomously in response to shared situational awareness data.

A tactical communications network will now be described with reference to FIG. 1. A tactical communications network facilitates information sharing and data exchange among tactical force units 40 to enhance operational processes and situational awareness. Examples of tactical communications network infrastructures include self-healing mesh networks, wide area networks (WANs), local area networks (LANs), mobile ad hoc networks (MANETs), and point to point networks. Any suitable communication protocol may be used to communicate in the tactical communications network of the present disclosure, such as Tactical Data Links (e.g. Link16, Link22), High Capacity Data Radio, Common Data Links, High Frequency Military Waveforms (e.g. TSM™), cellular (e.g. 5G, 4G LTE) and Wi-Fi. The tactical communications network is dynamic to changes in the position of units 40 making use of the network, location of enemy forces, or environmental factors such as the weather or terrain topography.

The deployed units 40 may include, for example, logistics assets, armoured fighting vehicles, reconnaissance vehicles, troops, and aircraft (such as close air support or loitering airborne early warning and control). The deployed units 40 may be required to communicate with each other or with a control station 10, for example a forward operating base (FOB) or Headquarters unit. Generally, the control station 10 is for controlling and deploying units 40 by issuing the units 40 with orders. The control station 10 is also for receiving and managing situational awareness data which may be gathered by those units 40 or other non-managed assets. The control station 10 may be a base of operations.

Where objects such as hills or buildings obfuscate the radio frequency line of sight between units 40 and/or control stations 10, or where those assets are too far apart to communicate with each other directly, it is necessary to use a relay (i.e. rebroadcast) node 20. Relay nodes 20 may be arranged to communicate with each other in order to extend the range of the tactical communications network. The relay nodes 20 may be wireless access points for the network. A relay node 20 receives a signal from a first asset (i.e. control station 10, unit 40 or another relay node 20), and transmits that signal to a second asset. By being positioned at a high vantage point, the relay node 20 is provided with a greater transmission capability than the asset transmitting data to it. The same relay node 20 may then operate in reverse, and transmit a signal to the first asset that was received from the second asset.

The tactical communications network may exploit units 40 already in the field. In other words, some units 40 may also be configured to perform the function of relay nodes to extend the range of the communications network or fill gaps in the mesh, as in prior art examples.

Figure 5A:
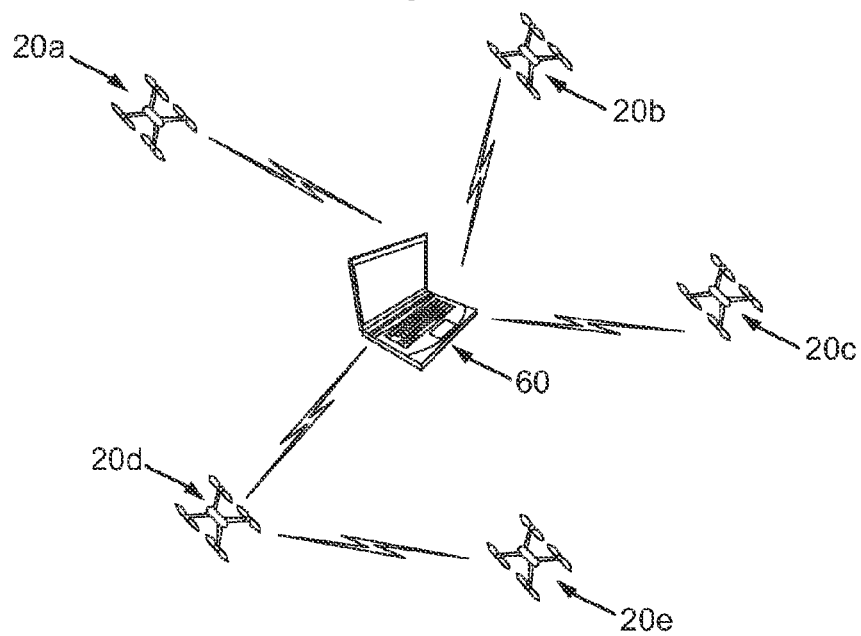
FIG. 5a is an example of a communications network topology.

The control station 10 may comprise a control unit 60 described in more detail with reference to FIG. 5a.

Figure 4:
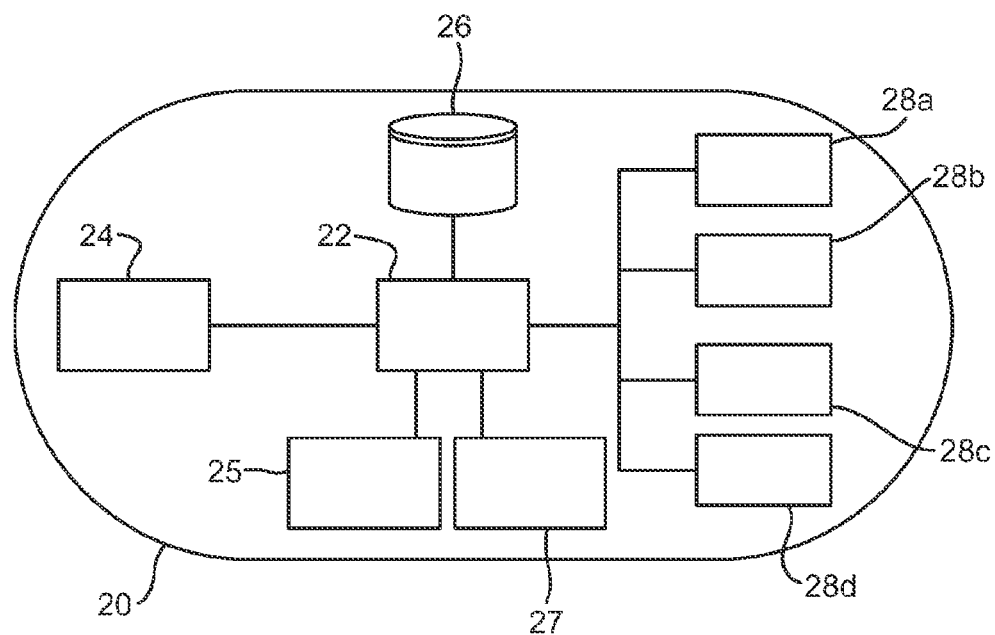
FIG. 4 is a system architecture of an unmanned aerial vehicle.
Figure 5B:
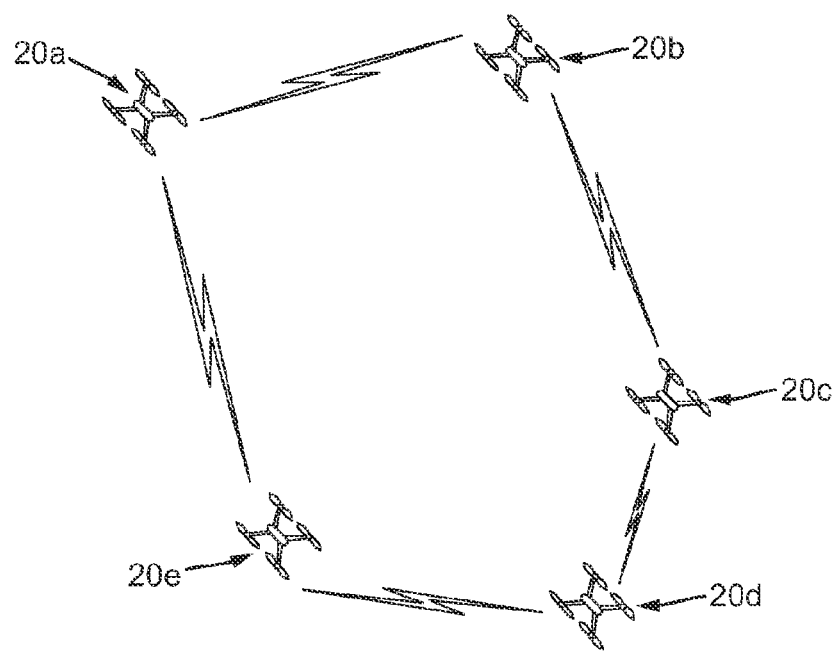
FIG. 5b is an example of a communications network topology.

In the example shown in FIG. 1, the tactical communications network enabling communication between the unit 40 and the control station 10 comprises a plurality of relay nodes 20a, 20b (generally 20). These relay nodes 20 provide a wide area mesh of high capacity low latency rebroadcast capability. A mesh network allows multiple traffic routes. The illustrated relay nodes 20 are in the form of unmanned aerial vehicles capable of vertical take-off and landing, described in more detail with reference to FIG. 4. In alternative embodiments, the relay nodes 20 may be unmanned ground vehicles (wheeled or tracked) or unmanned naval vessels (such as a surface ship or submarine). Relay nodes 20 are preferably autonomous to reduce threat to life and logistical burden, and to optimise the network more efficiently. The relay nodes 20 operate as part of a swarm. The swarm may be centrally controlled, as illustrated in FIG. 5a, or control of the nodes within the swarm may be distributed across the swarm, as illustrated in FIG. 5b. In other words, the swarm may self-manage connectivity of control stations 10 and units 40.

As illustrated in FIG. 1, the relay nodes 20 are designed to land on tall objects (relay sites 30a, 30b, generally 30). To facilitate landing, the relay nodes 20 may be equipped with securing means such as an operable harpoon, claw, or the like. In the illustrated example, a first relay node 20a has landed on a first relay site 30a in the form of a tree. Here, the first relay node 20a may have a claw member designed to grip braches. Alternatively, the relay node 20a may have retractable legs in order to present a smooth surface to the tree and thereby prevent entanglement. A second relay node 20b, in communication with the first relay node 20a, has landed on the top of a second relay site 30b in the form of a lamppost by gripping its cylindrical horizontal member with an securing (i.e. attachment) member and effectively "perching" thereon. Where the relay node 20 is a ground vehicle or naval vessel, or long endurance aircraft, it would be appreciated that the relay node 20 does not land on a relay site 30, and instead moves to the relay site 30 and powers down its motors or otherwise loiters at the relay site 30.

In some embodiments of the present disclosure, particularly where the relay node 20 comprises an unmanned aerial vehicle capable of landing vertically, other examples of relay sites 30 include chimneys, pylons, telegraph poles, rooftops, church spires, and hilltops. However, in embodiments where the relay node 20 is a ground vehicle, a relay site 30 may be any identified area of dry land that would satisfy signal reception/transmission conditions. In embodiments where the relay node 20 is a high altitude long endurance aircraft, the relay site 30 may be a limited region of airspace from which the relay node 20 can receive signals from the unit 40 and transmit them at the greatest range to a recipient asset. In other words, a relay site 30 may be identified as such (and therefore later considered or selected for use) based on the merits of its location, rather than due to an intrinsic property of the site/object. In some embodiments, an object may only be identified as a relay site 30 (or potential relay site) if it is above a threshold elevation (or height) relative to the elevation of the unit 40 being communicated with. For example, only hilltops above a threshold altitude may be identified as worth considering for stationing a relay node 20. In some embodiments, objects may only be considered potential relay sites 30 if they extend 10 metres or more above the local ground level. The threshold elevation may be determined based on the average height of objects in a region around a unit 40. Generally, relay sites 30 are those objects that would provide good RF line of sight to an intended recipient and transmitter, and hence long range, when a relay node 20 is positioned thereon. In other words, relay sites 30 are typically those objects in the vicinity of a unit 40 or control station 10 having relatively high elevation with nothing obfuscating the RF line of sight between them and another asset.

An RF line of sight may be considered suitable, or present, if the received signal strength enables a communications throughput between the relay node 20 and the asset that is greater than a threshold throughput. For example, an RF line of sight may be present if the relay node 20 and asset can communicate at a minimum of 50 mb/s. Preferably, the minimum throughput is at least 100 mb/s to provide a stable RF line of sight. Even more preferably, the minimum throughput is at least 200 mb/s to provide a stable RF line of sight.

A potential relay site 30 is analysed by a relay node 20 or control unit 60 to determine its suitability to act as a relay site 30 by enabling communication between the unit 40 (or control station 10) and the relay node 20 while providing the relay node 20 with the greatest range to transmit to another relay node 20, unit 40 or control station 10. Once a potential relay site 30 is considered suitable or optimal for transmission/reception of signals, it may then be further analysed to determine its suitability for landing or otherwise positioning the relay node 20. These analysis steps may be performed simultaneously or in reverse order. The potential relay site 30 is then selected for use at the relay site 30.

Each relay node 20 has a continuous duty cycle enabling it to provide communication between the assets for as long as they require it. Here, the control station 10 is required to transmit orders to the deployed unit 40. This cannot be directly achieved due to terrain features (e.g. a mountain range or forest) blocking RF line of sight. Therefore, a first relay node 20a is perched, or landed on the top of a first relay site 30a. This position provides good RF line of sight to a second relay node 20b, which is perched on the top of a second relay site 30b. From this position, the second relay node 20b is able to transmit the orders from the control station 10, via the first relay node 20a, to the unit 40. The swarm of relay nodes 20 creates a multi-hop radio link between two sites (i.e. the control station 10 and deployed unit 40), which could be around 100 km apart. The range extension provided by one relay node 20 is of the order of 5-10 km. By increasing the number of relay nodes 20, the transmission range of the tactical communications network can be increased in theory without limit.

One relay node 20 may be tasked to a plurality of units 40. In other words, the relay node 20 may be required to position itself such that it is able to receive signals from each of the plurality of units 40, and rebroadcast those signals to another relay node 20 or control station 10. Signals may not be rebroadcast in their originally received form; for example, signals may be rebroadcast having an adjusted frequency, channel, power or gain. Data contained in those signals may be transmitted using a different communications protocol from that by which it was received.

Figure 2:
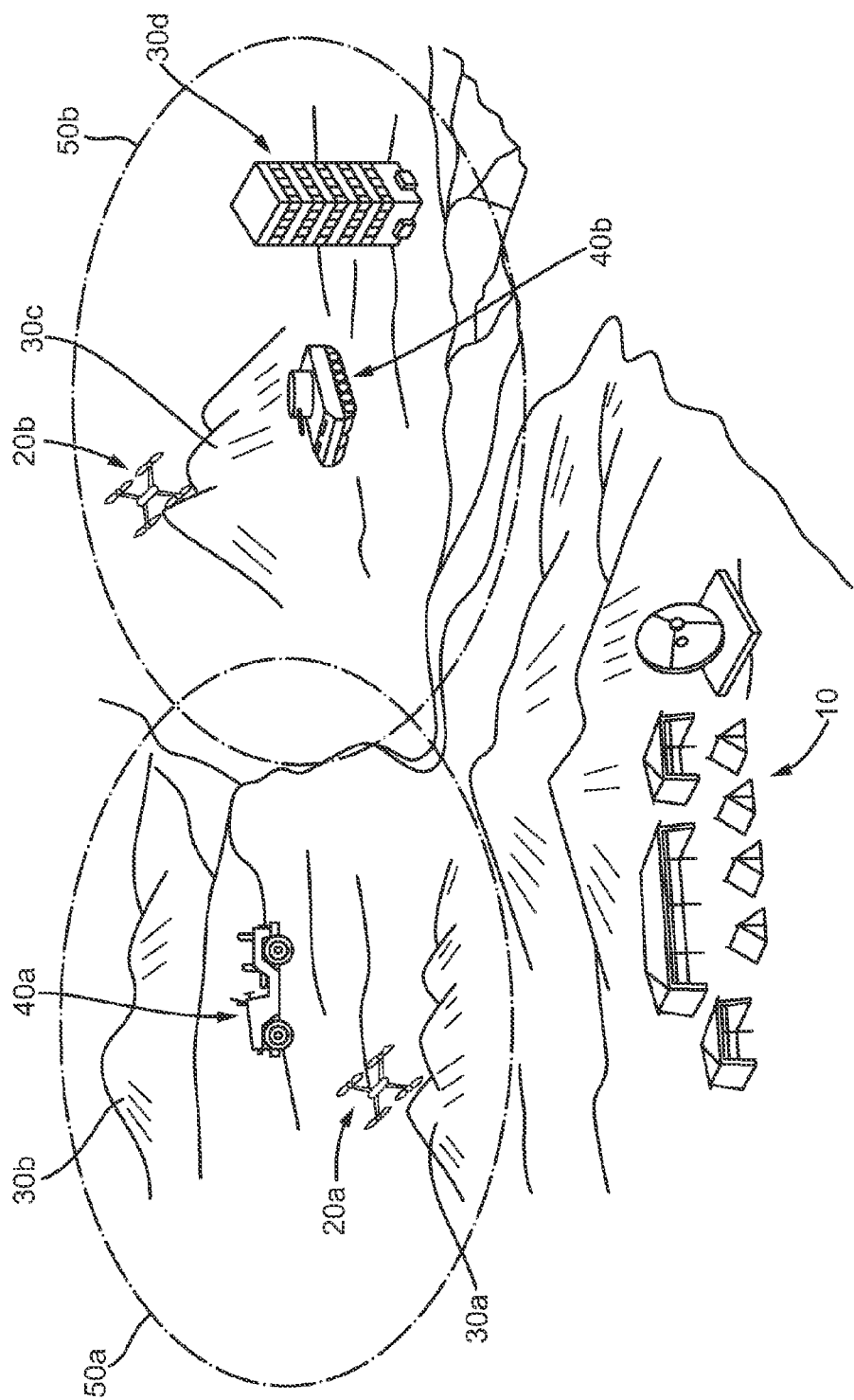
FIG. 2 is a system diagram of a deployed tactical communications network.

FIG. 2 illustrates another example of a tactical communications network for providing communication capability to a plurality of units 40a, 40b and a control station 10 in challenging terrain. Here, a first unit 40a, in the form of a jeep, and a second unit 40b, in the form of an armoured fighting vehicle, are deployed to separate locations in the battlefield out of radio range of each other and a control station 10. The units 40a, 40b are equipped with radios for transmission or reception of signals, but to comply with EMCON (emissions control) or power requirements, these radios may have a relatively short range. The control station 10 is a headquarters unit that may need to communicate with both units 40a, 40b in order to issue orders to them and receive situational awareness data from them. The tactical communications network may exploits assets already in the field. In other words, the units 40 may also perform the function of relay nodes to extend the range of the communications network or fill gaps in the mesh, as in prior art examples.

The two available relay nodes 20a, 20b are controlled to move to respective geographical regions 50a, 50b. Regions 50a, 50b (generally 50) are defined as those requiring at least one relay node 20 in order to optimise the tactical communications network to allow assets within the respective region 50a, 50b to communicate with those in another region 50a, 50b. A signal transmitted by an asset (i.e. a relay node 20, unit 40, or control station 10) within a region 50 should theoretically be detectable by a relay node 20 that moves to the region 50.

The units 40a, 40b are shown toward the centre of respective regions 50a, 50b to illustrate which region 50a, 50b is associated with which unit 40a, 40b. However, it would be appreciated that unit 40a, 40b does not need to be within a region 50a, 50b. The region 50 may be an area of the battlefield which is generally within communications range of transmitting and receiving assets. The size, shape or diameter of the regions 50 (in other words, position of region boundary) may be a function of the form or size of the relay node 20, and/or the maximum range of the communications systems being used. The size, shape or diameter of each region 50 may be preconfigured or depend on terrain or mission parameters; for example, they may all be circles with a diameter of 1 kilometre. The size, shape or diameter of the regions 50 may be a function of the range of the transmission capability of the asset, or the predicted signal strength taking account of signal attenuation features.

While two regions 50a, 50b are illustrated in FIG. 2, there may be many regions 50 or only one region 50. Each unit 40a, 40b is associated with a respective region 50a, 50b, the scope, shape and position of which is influenced by the location of the unit 40a, 40b and the transmission and/or reception capability of that unit 40a, 40b. The environment, weather or other signal attenuation factors may also be taken into account when determining the size, shape or position of a region 50 to move a relay node 20 to. For example, if a unit 40 is known to be positioned in a city surrounded by tall buildings, the region 50 associated with it may be limited to the city block in which the unit 40 is located, as a signal transmitted from it is unlikely to travel far due to the presence of the buildings.

The regions 50 may overlap each other. The regions 50 may be localised to a few hundred square metres, for example, a city block, area of woodland or a street. However, the regions 50 may also be geographically widespread; for example, there may be only one region, which encompasses the entire battlegroup (i.e. all of the assets). The regions 50 may be of different sizes or shapes to each other, while in the illustrated embodiment the two regions 50a, 50b are both identical ellipses. The shapes of the regions 50 may be regular or irregular.

Alternatively, a plurality of units 40 in proximity to each other may be associated with the same region 50. In other words, a region 50 shape, size or location may be chosen to encompass as many units 40 as possible, which ensuring that a relay node 20 placed within that region 50 would be able to communicate with all of the units 40 encompassed by it.

The number of regions 50 may be influenced by the number of relay nodes 20 available; for example, each relay node 20 may be assigned one respective region 50 to move to, as illustrated in FIG. 2. Positioning a first relay node 20a in the location where the two regions 50a, 50b intersect may provide communication between the first unit 40a and second unit 40b, but in this example this area of terrain is at a relatively low altitude, and therefore placing a single relay node 20a here would prevent signals from being transmitted to or from the control station 10. Therefore, in this example, the second relay node 20b would still be advantageous and sent to a region between the intersecting area and the control station 10.

In some embodiments, the location, size and shape of regions 50 are determined by the respective relay nodes 20, i.e. autonomously. In some embodiments, a control unit 60 determines the location, size and shape of the regions 50 and controls the relay nodes 20 to move to respective regions 50. In some embodiments, particularly those whereby the tactical communications network is a self-healing mesh network, the region 50a, for one relay node 20a may be defined by another relay node 20b or by all of the relay nodes 20 acting in unison.

As well as individual units 40, each relay node 20 may have a region 50 associated with it. Where a first relay node 20a is performing the function of a signal relay for a first unit

40*a*, but the first relay node 20*a* does not have the range to rebroadcast a received signal to the intended recipient, it is assigned a region 50. This is a geographic area that a second relay node 20*b* must move to in order to be able to communicate with the first relay node 20*a* and the intended recipient (or a third relay node). Each relay node 20, or a control unit 60, is aware of the location, size and shape of all of the regions 50, and redefines the regions 50 for the relay nodes 20 to move to such that the network can be completed. This may be an iterative process.

Regions 50 are defined using knowledge of the physical location of the assets needing to communicate, and the transmission and/or receive capability of those units. For example, if there is a single unit 40 known to be located 100 km from a control station 10 with which it needs to communicate, with a transmission range of 25 km, a relay node 20 will be controlled to position itself on a relay site 30 in a region at most 25 km from the unit 40. The relay node 20 may then be able to retransmit a signal received from the unit 40 to the control station 10 due to its increased range. The determined position of the region 50 may be a function of the location of both the unit 40 and the control station 10. Regions 50 may also be defined around relay nodes 20 themselves, such that a multi-hop link can be created between the asset 40 and the control station 10. Other factors such as the weather or presence of terrain features may also define the shape and location of a region 50. For example, if it is raining, a region 50 will have to be more localised around a unit 40 as the unit 40 will not be able to transmit signals as far as it would if it were not raining.

Each region 50*a*, 50*b* contains a plurality of potential relay sites 30*a*, 30*b*, 30*c*, 30*d*, which are evaluated and the optimal relay site 30*a*, 30*c* selected in each region 50*a*, 50*b*. In the illustrated example, the first relay site 30*a*, in the form of a hilltop, and the third relay site 30*c*, also in the form of a hilltop, have been selected as optimal relay sites at which to place a respective relay node 20*a*, 20*b*. The second relay site 30*b*, in the form of a hilltop, and the fourth relay site 30*d*, in the form of a tall building, were not selected as locations from which to station a relay node 20. The process by which a relay site 30 is selected will be described in more detail below.

In another embodiment, instead of geographical regions 50 containing relay sites 30 being determined, a relay node 20 may simply be provided with the location of an asset with which it is to communicate. Advantageously, the relay node 20 is also provided with (or itself determines) the transmit/receive capability of that asset and information about signal attenuation factors. The relay node 20 is then controlled to move into the vicinity of the asset and select a relay site 30, from a plurality of potential relay sites 30, from which it can stop and communicate with the asset and advantageously a further asset such as another relay node 20 or a control station 10. The relay site 30 is selected using the same methodology as for the other described embodiments, but here it is not within a predefined region 50.

A relay site 30 may be selected as the site from which to station a relay node 20 as it matches (i.e. satisfies) more conditions than another relay site 30. These conditions may be stored in a database on-board the relay node 20.

Alternatively, these conditions may be stored on a server and accessed via the tactical network. The conditions may be stored in a server part of or coupled to the control unit 60. The conditions may include but are not limited to the gradient of the surface of the relay site 30; the surface type (i.e. grass, swamp, concrete, metal, foliage, wood, water); the diameter of the relay site (e.g. the diameter of the vertical structure of a lamppost); the curvature of the surface; the surface area of the surface; the maximum elevation (i.e. height, or altitude) of the relay site 30; and the radio frequency (RF) signal strength that would be received at the relay site 30 from a predetermined transmitting asset.

It may be critical that some minimum/maximum conditions (i.e. threshold conditions) are satisfied by a relay site 30 in order for the relay site 30 to be selected, but not others. For example, it may be essential that a minimum RF signal strength requirement is met as without it the relay node 20 would not be able to communicate with the asset and fail its mission; and it may also be essential that a maximum gradient of a surface is not exceeded, else the relay node 20 will slip off when it lands and again fail its mission. Meanwhile, other conditions may be optional or ranked hierarchically, such as the type of object or material.

Using FIG. 2 to illustrate an example, it may be that two potential relay sites 30*a*, 30*b* provide clear RF line of sight to the unit 40*a*. However, the steepness (i.e. gradient) or surface material of one relay site 30*a* (relative to the horizontal plane) may make it more suitable for landing than the other relay site 30*b*, and therefore the first relay site 30*a* is selected over the second relay site 30*b*. It may also be the case that while both relay sites 30*a*, 30*b* provide clear RF line of sight to the unit 40*a*, the relay node 20 takes account of the fact that the unit 40*a* will move and one relay site 30*a* may provide a clearer RF line of sight to more of the surrounding area than the other 30*b*, and therefore again the first relay site 30*a* is selected. Generally, a relay site 30 will be selected if it allows a relay node 20 to be positioned up high with as clear a Fresnel Zone as possible.

Relay sites 30 may be compared with each other such that the "best" relay site 30 is chosen. The best relay site 30 may be the one that matches the most conditions, or has parameters that meet the minimum conditions and exceed the same parameters of other relay sites 30. For example, while two relay sites may be flat enough to land on, it may be that the flatter relay site 30 is selected. Alternatively, the relay site 30 selected may be merely the first relay site 30 that is identified as matching the critical conditions.

Data relating to the potential relay sites 30 may be gathered by the relay node 20 or another asset in the network. The data gathered for each relay site 30 is then compared against the stored list of conditions. It may be necessary to process the data before a comparison with conditions can be made. Data may be gathered, for example, by taking images of the relay sites 30 using a sensor (e.g. camera) on-board the relay node 20. The images can then be used to determine the elevation of an object along with its shape, structure, type, diameter, gradient, etc. Data may also be gathered by retrieving mapping data indicating the elevation of land or its gradient (i.e. relief); retrieving satellite data indicating the temperature or material of the relay sites; or retrieving architectural data indicating the height of known objects. Retrieving data may comprise accessing a server on the internet at a control station 10, and transmitting data on that server to the relay node 20. Alternatively, a control unit 60, for example located in the control station 10, may process or retrieve data relating to the relay sites 30 and select a relay site by comparing the data with the stored conditions. The control unit 60 may then transmit a signal to the relay node 20 instructing it to move to the selected relay site 30.

It may be the case that a region 50 or area where a relay node 20 is required only comprises one potential relay site 30. In this case, the relay site 30 may not be automatically selected for use as it may not satisfy the critical minimum/ maximum conditions. Instead, the network may be redistributed such that further relay nodes 20 become available, thereby enabling different positioning of relay nodes 20 to be possible to make use of further relay sites 30. Further, where relay nodes 30 are unmanned aerial vehicles, instead of landing on the only available but unsuitable relay site 30, they may be configured to remain airborne and rebroadcast received signals or act as an access point until the unit 40 requiring the relay node 20 moves or the situation otherwise changes.

The tactical communications network is redeployable and dynamically responsive to changes in requirements (which comes from the situational awareness shared between assets) and degradation of performance of signal quality. In other words, the relay nodes 20 are repositionable.

As explained, planning, deployment and operating of the wide area network may be performed by an artificial intelligence (AI) engine (which may be distributed across the network) which requires no additional human input. The AI engine will be undertaking continuous assessment of multi-path propagation analysis to ensure the relay nodes 20 are able to interconnect the units 40 and/or control station(s) 10. This analysis may be based on shared situational awareness received via units 40 in the network, or a unit 40 in communication with the AI engine.

By utilising unmanned vehicles as relay nodes 20, present embodiments also enhance a condition where there are so many signal emitters that it obscures any exploitable signals intelligence to the enemy. The system as a whole will protect soldiers from risky, isolated deployments so they can focus on service delivery to the headquarter locations and reduce risk to life.

A swarm of swarms (i.e. mesh of meshes) could be used to overcome limited numbers of relay nodes 20.

In another embodiment, illustrated in FIGS. 3a and 3b, a region 50 is an airspace channel, or, in other words, a 3D region of airspace joining two points between which communication is desired. The airspace channel has a first asset (in the illustrated example, HQ1, a control station 10a) positioned at a first end and a second asset (in the illustrated example, HQ2, another control station 10b) positioned at the second, opposite, end of the channel. The relay node 20 or alternatively the control unit 60 may determine or receive the positions of the first and second assets in order to define the airspace channel. The airspace channel may have a fixed, predetermined, width. For example, the region 50 may be 50 meters wide, extending between the first asset and second asset. The width of the region 50 may instead be a function of the size or form of the relay node 20. For example, the region 50 for a large solar HALE aircraft may be in the order of kilometres wide, while for a 5-10 kg quadcopter may be of the order of less than 10 meters wide.

In the present example, it is desired for the first asset to communicate with the second asset, but they are out of direct communications range of each other. Therefore, a first relay node 20a is deployed to travel along the region 50 (i.e. channel, corridor or path) from the first asset towards the second asset. The first relay node 20a measures the RF signal strength received from the first asset periodically along the channel. As the distance between the relay node 20a and the first asset increases, the received RF signal strength decreases. As soon as the received RF signal strength drops below a threshold value, the first relay node 20a moves back towards the first asset. For example, the threshold value may be the minimum RF signal strength required to provide a throughput of at least 50 mb/s. Preferably, the minimum RF signal strength is signal strength providing a throughput of at least 100 mb/s. Even more preferably, the minimum RF signal strength is signal strength providing a throughput of at least 200 mb/s. The first relay node 20a then selects a first relay site 30a (in the illustrated example, a skyscraper) to land on and lands on it. The selected relay site 30a may be the nearest relay site to the position at which the signal strength drops below the threshold value. The process for identifying and selecting a relay site 30 is the same as for any other described embodiment.

A second relay node 20b is then deployed along a region 50 (i.e. channel) having the first relay node 20a positioned at the first end, with the second asset being positioned at the second end of the region 50. In other words, the first relay node 20a becomes the first asset from the perspective of the second relay node 20b. The second relay node 20b moves along the region 50 from the first relay node 20a towards the second asset, continuously or intermittently measuring signal strength of a signal received from the first relay node 20a. The second relay node 20b continues to travel along the region 50 until its received signal strength (that is, signal strength of a signal received from the first relay node 20a) drops below a threshold value. The second relay node 20b then moves back towards the first relay node 20a to select a second relay site 30b (in the illustrated embodiment a treetop) to land on. The second relay node 20b lands on the selected second relay site 30b, which may be the closest relay site to the position where the received signal strength drops below the threshold value.

This process is repeated iteratively with further relay nodes (e.g. third relay node 20c) until the original first and second assets are communicably linked.

In embodiments where there relay nodes 20a-c are ground or naval vessels, the region 50 may be any suitable channel, such as a road or area of a defined width between the two assets.

In another embodiment, instead of moving back towards the first asset when the received RF signal strength drops below a threshold, the relay node 20 may be controlled to fly towards the first asset from the second asset (or towards the second asset from the first asset) until its received RF signal strength exceeds a threshold, at which point it selects a relay site 30 from a number of identified relay sites in its immediate vicinity to move to. For example, a relay site less than 1 km from the position where the received signal strength exceeds the threshold is selected.

In another embodiment, the relay node 20 is configured to select a relay site 30 in its immediate vicinity when the received RF signal strength drops below a first threshold. For example, a relay site less than 1 km from the position where the received signal strength drops below the first threshold is selected. When the relay site 30 has been selected and the relay node 30 has moved to it, the RF signal strength is measured again to determine whether it is greater than a second lower threshold value.

An example of a relay node 20, specifically a relay node 20 in the form of an unmanned aerial vehicle, will now be described with reference to FIG. 4. The relay node 20 is an aircraft weighing about 15 kg and a diameter of less than 1 metre. In alternative embodiments, the relay node 20 may take the form of a ground vehicle or naval vessel (including underwater). The relay node 20 is preferably solar-electric powered (where the power source is not shown in the Figure). However, in other embodiments, the primary power source of the relay node 20 may be hybrid, hydrogen, or hydrocarbon based. For example, a petrol engine provides a relay node 20 with a range of 80 km and the option of using the petrol engine (i.e. generator) to charge the on-board radio 27 batteries. Relatively small photovoltaic panels may be used to provide charging when sunlight is available during the day, and batteries may be used at night to power the relay node 20, to effectively give the relay node 20 a continuous duty cycle. This enables the relay nodes 20 to be launched and left without human intervention to deploy, land, and redeploy and generally self-manage the network.

The relay node 20 comprises a controller 22. The controller 22 may take any suitable form. For instance, it may be a microcontroller, plural microcontrollers, a processor, or plural processors. In some embodiments, the controller 22 is arranged to entirely self-manage the relay node 20. For example, the controller 22 is arranged to perform the method steps outlined in FIG. 6 in their entirety. Here, the controller 22 is arranged to use the location and transmission capability of an asset (such as a unit 40, control station 10 or another relay node 20) to determine a region 50 to move the relay node 20 to. The controller 22 is arranged to control the relay node 20 to move to that region 50 by generating control signals, which are sent to the relay node's flight control surfaces 28a-d. The region 50 may be the location of the asset or an area around or near the asset. The region 50 may be a path between the two assets that need to communicate with each other. While at the region 50, the controller 22 may control a sensor 24 to image an object in or near the region 50 to obtain data on the object. The controller 22 may also analyse a signal received from the asset while the relay node 20 is at (or virtually at) the object to determine a received signal strength (or quality). Alternatively, the controller 22 may continuously, or at time or distance intervals, measure the strength of a signal received from a first asset as the relay node 20 moves along the region 50 towards a second asset. The controller 22 then uses the data and the signal strength to determine if the object is a suitable or even optimal relay site 30 to operate from. The controller 22 may control an actuatable securing device 25 to facilitate landing on the selected relay site 30. Here, a landed relay node 20 means the main propulsion units 28a-d of the relay node 20 can be powered down while the relay node 20 remains substantially stationary. The controller 22 is arranged to control a radio 27 to communicate with the unit 40.

In other embodiments, only some of the functions briefly outlined above may be performed by the controller 22. Instead, some functions may be performed by another entity and the output of those functions received by the radio 27 for use by the controller 22. For example, while the controller 22 may still control the flight control surfaces 28a-d to control movement of the relay node 20, it may receive the location of the region 50 to move to from another entity.

In another embodiment, instead of the controller 22 being configured to determine the strength of a signal received from an asset at the object, it may infer or assume signal strength based on a line of sight, which is determined by processing mapping data and knowing the location of the asset, elevation of the object, and presence of any objects in between.

In other embodiments, some steps may not be performed at all; for example, instead of determining a region to fly to, the relay node 20 may already be in the appropriate area so may immediately determine and select a relay site 30 to land on. The controller 22 may be arranged to communicate with other relay nodes 20 in the swarm and determine tasks for those other relay nodes 20 to implement. For example, the controller 22 may be arranged to select a relay site 30 or determine a region 50, and transmit the coordinates of that relay site 30 or region 50 to another relay node 20 such that the other relay node 20 can move to it.

The relay node 20 according to the illustrated embodiment comprises a database 26 comprising a set of conditions that indicate suitability of potential relay sites 30 (i.e. objects in an area) to act as relay sites 30. The database 26 may be any suitable data storage device, such as read only memory, random access memory, a plug-in hard drive (including a USB memory stick), CD-ROM or the like. The conditions may be landing conditions, where the relay node 20 is an unmanned aerial vehicle, which indicate the suitability of a potential relay site 30 for landing. In other words, while a relay site 30 may satisfy conditions necessary for it to be suitably used as a relay site 30 from a signal transmission/reception perspective, it may not be suitable for an aircraft to land on. The database 26 may also comprise mapping data or terrain data such as land elevation, gradient or surface structure (i.e. snow, sand, bog, etc. as identified from satellite or overflight imagery). The database 26 may include the location of units 40, control stations 10 and control units 60 (where present). As the units 40 move, the database 26 may be updatable during operation of the relay node 20 through shared situational awareness. The database 26 may also include last known positions of enemy units.

The controller 22 is arranged to communicate with propulsion units (i.e. motors) 28. The relay node 20 depicted in the Figures is a quadcopter-type unmanned aerial vehicle, with four propulsion units 28a-d that can be adjusted to control pitch, velocity, heading and lift of the relay node 20. In other embodiments, the relay node 20 may take a different form, such as that of a traditional aeroplane, helicopter, airship, vertical take-off and/or landing aircraft, or balloon. The relay node 20 may be a solar-driven high altitude long endurance aircraft, designed to loiter in a region at a relay site 30 (where the relay site 30 is not an object, but merely a position having x, y and z coordinates). Therefore, in other embodiments, there may be less than or more than four propulsion units 28a-d.

The unmanned aerial vehicle comprises flight control surfaces such as rotors, elevators, ailerons, flaps, and propellers. The controller 22 may control the propulsion units 28a-d to increase or decrease the velocity of the relay node 20. The controller 22 is arranged to generate control signals to control the propulsion units 28a-d to change the direction of flight and/or altitude and/or attitude and/or velocity of the relay node 20 to move it toward a region 50 and land on a selected relay site 30. Where the relay node 20 is a ground vehicle or ship, the relay node 20 may instead comprise an engine for driving propulsion means such as a propeller or set of wheels, and comprise control surfaces such as a rudder.

The relay node 20 according to the illustrated embodiment comprises a sensor 24. The sensor 24 may comprise an imaging device such as optical camera, multispectral camera, or LIDAR. The sensor 24 may also comprise a sonar device, radar, or synthetic aperture radar. The sensor 24 is for gathering data on potential relay sites 30 such that one can be selected by the controller 22 for use. The controller 22 may use computer vision technology to determine the type, structure, shape (etc.) of the object defining the potential relay site 30. The sensor 24 may comprise a wind speed/direction measuring device. The controller 22 is arranged to analyse the data received by the sensor 24 and compare it with the conditions stored in the database 26. For example, the data obtained by the sensor 24 may indicate the height of an object. Alternatively, the height of the object may be determined from mapping data also stored in the database 26.

The controller 22 may use image recognition software to identify the type of object in the sensor image, which is used in selecting a relay site 30. For example, a tree and a lamppost may provide equally ideal locations for receiving and transmitting signals due to their location and height; however, the lamppost may be chosen over the tree as the tree branches may result in damage or entanglement of the relay node's propellers. The type of object may also be indicative of its material; for example, it is known that a lamppost will be made of metal. It may be the case that a relay node 20 is not equipped or configured to attach to a metal object.

An actuatable securing device 25 is provided. The actuatable securing device 25 is for gripping or otherwise attaching a relay node 20 to a relay site 30 so that its propulsion units 28a-d can be powered down without it falling off the object. The actuatable securing device 25 may include pincers, grips or a harpoon. Landing the unmanned aerial vehicle on a relay site 30 tends to provide the advantage of reducing the power requirements of the unmanned aerial vehicle, as it does not need to keep its propulsion units 28a-d in operation while it is performing its key function of rebroadcasting signals (or data contained in a received signal). By providing securing device 25, the unmanned aerial vehicle can be effectively landed on a wider choice of relay sites 30. In other embodiments, the unmanned aerial vehicle may comprise skids, wheels, prongs or the like instead of the actuatable securing device 25.

The relay node 20 comprises a radio 27 transceiver for relaying signals. The radio 27 comprises a receiver element and a transmitter element. In other embodiments, the relay node 20 may comprise one radio for receiving signals and another radio for transmitting signals. Here, the two radios may operate on different frequencies, channels or operate according to different communications protocols. The radio 27 is electrically coupled to at least one antenna. The radio 27 tends to provide a 50-200 MB/s link throughput. The radio 27 may be driven by the relay node's main power source, i.e. the same power source powering the propulsion units 28a-d. Alternatively, the radio 27 may be powered by an independent battery supply. The radio 27 may process received data and rebroadcast it on a different signal frequency, channel, strength, gain or protocol from the signal on which the data was received. In some embodiments, the radio 27 provides the relay node 20 with the capability to act as a network access point.

On aggregation, the relay nodes 20 in operation may cause a vast quantity of low-level noise. This low-level noise tends to make it difficult for an enemy to determine the location of individual relay nodes 20.

An example of a network topology according to embodiments of the present disclosure will now be described in more detail with reference to FIG. 5a. Here, five relay nodes 20a-e are operable to provide communication links between a plurality of units 40. First through fourth relay nodes 20a-d are in direct communication with a control unit 60. A fifth relay node 20e, out of communication range of the control unit 60, is communication with the fourth relay node 20d. The fourth relay node 20d rebroadcasts signals from the control unit 60 to the fifth relay node 20e.

The control unit 60 is a comprehensive planning and monitoring tool, which can be hosted on extant defence systems. The control unit 60 may be a mobile ground station, such as a truck, selected relay node 20 or a redeployable shipping container. Alternatively, the control unit 60 may be a fixed ground station. The control unit 60 may be co-located with the control station 10. Generally, the control unit 60 is a network manager for distributing relay nodes 20 and managing network traffic.

More specifically, in some embodiments, the control unit 60 is for determining a respective region 50 for each of the relay nodes 20a-e to move to and generating instructions for the relay nodes 20a-e to move to those regions. The instructions are transmitted from the control unit 60 directly or indirectly (i.e. via a relay mode 20d) to the relay nodes 20a-e. The instructions for each relay node 20 may be contained in a single message (i.e. packet). Therefore, each relay node 20a-e will be aware of the general location of the other relay nodes 20a-e. Alternatively, each the relay nodes 20a-e may receive a different message containing their respective instructions.

In an alternatively embodiment, the control unit 60 generates instructions containing the location of a unit 40 to be communicated with. The instructions are then transmitted to the relay nodes 20a-e to move to the location as outlined above.

In some embodiments, each relay node 20a-e may then identify and select a respective relay site 30 in the region 50, or first define its own respective region 50 based on the location of the unit 40 in the instructions. In another embodiment, the control unit 60 may identify and select respective relay sites 30 for each of the relay nodes 20a-e and instruct the relay nodes 20a-e to move to the selected relay sites 30.

The control unit 60 may communicate with the control station 10 to maintain a map of the locations of the units 40 and receive situational awareness updates. Therefore, as the situation in the battlefield changes, the control unit 60 can generate and transmit new instructions to the relay nodes 20a-e to optimise the network. For example, a relay node 20 may be predeployed to a region 50 that is likely to require a relay node 20 in the future, based on predicted or planned movement of an asset. The control unit 60 may also receive regular or ad hoc network or vehicular status (i.e. health) updates from each of the relay nodes 20a-e. Health updates may include a received signal strength or report of system capability, including remaining battery life or damage. Therefore, as a received signal quality degrades or as a relay node 20a-e suffers a systems failure, the control unit 60 may redistribute the other relay nodes 20a-e to heal the network. Situational awareness data may include, for example, distribution of units 40 or enemy forces, or changes in weather.

Another example of a network topology according to an embodiment of the present disclosure is illustrated in FIG. 5b. Here, there is no single control unit 60 as in FIG. 5a, but the network (i.e. swarm) of relay nodes 20a-e is self-managed. The control unit 60 (or function thereof) is effectively distributed throughout the network of relay nodes 20a-e.

FIG. 5b illustrates the relay nodes 20a-e connected by a ring topology, where one relay node 20a connects to exactly two other relay nodes 20b, 20e. A single continuous pathway for signals through each node is formed. Data travels from one relay node 20a to a destination relay node 20d, with each relay node 20b, 20c along the way handling every packet. However, the topology may take any suitable form, such as a bus, star, tree, mesh or Barrage Relay™.

In one embodiment, each of the relay nodes 20a-e is capable of determining new regions and/or relay sites 30 for one or more of the other relay nodes 20a-e. The relay nodes 20a-e communicate and work together to optimise the network. Each relay node 20*a-e* knows the location of the other relay nodes 20*a-e*. The movement of one relay node 20*a* affects network stability, requiring another relay node 20*b* to move to heal the network, which in turn affects network stability at the other relay nodes 20*c-e*. Therefore, each relay node 20*a-e* transmits situational awareness and/or network or vehicular health data to the other relay nodes 20*a-e* such that the network can be optimised. The swarm collectively maintains itself in the field and reacts to changes in requirements.

This can be particularly useful where a first relay node 20*a* is rebroadcasting a signal from a unit 40 to another relay node 20*b*. The second relay node 20*b* is in turn communicating with another asset, and moving would have a strongly negative impact on network stability. Therefore, the second relay node 20*b* is able to inform the first relay node 20*a* of its position and relatively low signal strength. The relay node 20*a* is then able to determine a position to move to that would allow good connectivity with both the unit 40 and the second relay node 20*b*. Alternatively, the second relay node 20*b* can instruct the first relay node 20*a* where it should move it (i.e. a region 50 or relay site 30) to optimise the connection. Alternatively again, the first relay node 20*a* and second relay node 20*b* may negotiate with each other and decide between them that they should both move, or perhaps move a third relay node 20*c*.

In an alternative embodiment, each relay node 20*a-e* may be entirely independent of the others and thereby act as its own control unit in deciding where to move to in order to improve connectivity for itself and the unit 40 (or other asset) in its remit. The functions of the control unit 60 may be performed by the controller 22, or a second on-board processor. Instead of each relate node 20*a-e* communicating its position to the others, each relay node 20*a-e* may independently deploy based on information it has itself gathered through on-board sensors.

A method of distributing a tactical communications network will now be described with reference to FIG. 6. In a first step S600 a region 50 or asset (i.e. unit 40, control station 10 or relay node 20) that would benefit from placement of a relay node 20 is identified. In other words, a relay node 20 may be assigned to an asset or a plurality of assets, in order to provide them with extended communication capability. Assets requiring a relay node 20 may be identified by using their location or future location, and known transmission capability, to determine if intended recipient assets would be in range. If the intended recipient is not in range, then a relay node 20 is required to rebroadcast data. Identifying a region 50 or asset may comprise determining the location of the asset and/or the location of an intended recipient asset, along with the transmit/receive capability of those assets. Determining locations may comprise receiving those locations from a database 26 or via the radio 27. It may not be required to know the location of the recipient asset, as that recipient asset may be arranged to position itself or otherwise managed to receive a signal with appropriate throughput from the relay node 20 no matter where the relay node 20 moves to. The relay node 20 may then move towards that region 50 or asset.

Before the relay node 20 starts to move, or when it reaches its destination, the relay node 20 or a control unit 60 may identify potential relay sites 30 in step S610. This may be achieved by using terrain or mapping data to identify buildings or terrain features greater than a threshold height. The threshold may be set according to the average height of buildings or terrain features in the area.

Identifying a relay site means identifying an object, plurality of objects, or a particular location that may be suitable for being a position at which positioning a relay node 20 would enable communication between the unit 40 and the relay node 20 while providing the relay node 20 with long range RF line of sight such that other assets can receive a signal broadcast from it.

At step S620, the identified relay sites 30 are compared against a list of conditions stored in the database 26. Data relating to the identified (i.e. potential) relay sites 30 may be gathered for purposes of comparison with the conditions using the sensor 24, or received using the radio 27. The data may relate to the shape, angle, surface area (of any landing zone), height, location or type of object being potentially used as the relay site 30. The data may be mapping data, satellite image data, or architectural data, for example. An RF test is virtually conducted at each of the relay sites 30 to determine what the received signal strength would be at that relay site 30, and compared with a stored threshold condition. The controller 22 may for example use Great Circle calculations or an appropriate path profile analysis tool to conduct the RF test. By comparing data relating to relay sites 30 with the conditions, a decision can be made in step S630 to select one of the relay sites 30. It may be the case that none of the identified relay sites 30 are suitable, and therefore the process of choosing a region 50 may begin again such that new relay sites 30 are identified.

The selected relay site 30 may be that relay site matching the most conditions, or matching most preferred conditions. Step S630 may firstly involve determining if an identified relay site 30 is suitable to be a site from which to receive and transmit RF signals, and secondly involve determining if that suitable relay site 30 can be landed upon. One example of choosing a relay site 30 may be as follows. The controller 22 may determine, using temperature data and image data that a rooftop is covered in ice and slopes at 30 degrees to the horizontal. The database 26 may contain a condition indicating the maximum gradient that a relay node 20 can land on in icey conditions. If the threshold gradient is exceeded, the relay site 30 is not selected, as the relay node 20 would slide off if it were to land. Similarly, the sensor 24 may indicated that a lamppost is of a certain diameter around its vertical axis. A condition stored in the database 26 may indicate that the securing device 25 can only grip objects less than a threshold diameter. If the condition is not met, then the relay site 30 is not selected. The height of a relay site 30 can be used to predict whether an RF line of sight to assets can be achieved. RF connectivity is an important condition, but if a relay node 20 cannot land on the relay site 30 providing perfect RF connectivity, then the relay site 30 is not suitable. Some negotiation may take place within the controller 22 to select an optimal relay site 30. In other words, a relay site 30 may be selected as it matches all minimum conditions, even if there are relay sites 30 available that far exceed some of the conditions as these better relay sites 30 may not meet one or more of the minimum conditions.

At step S640, the relay node 20 is arranged to move to the selected relay site 30. Moving to the relay site 30 may comprise landing on the relay site 30. The relay node 20 may receive instructions to move from a control unit 60, or may self-generate the instructions using the controller 22. Landing on the relay site 30 may comprise deploying or actuating a securing device 25. Optionally, a further RF test may be conducted once the relay node 20 has moved to the relay site 30 to ensure connectivity requirements are met.

At the relay site 30, the relay node 20 is arranged to substantially power down, such that only the radio 27 and controller 22 are powered. For example, the propulsion units 28*a-d* are switched off.

Once at the selected relay site 30, the relay node 20 can use its radio 27 to receive a signal from the unit 40. The signal comprises data, such as the unit's location, situational awareness or a status update. The data is then transmitted to another asset, such as another unit 40, control station 10 or relay node 20. By rebroadcasting the data, the relay node 20 effectively extends the unit's effective range. The signal comprising the data may be rebroadcast in its original form. In other embodiments, the relay node 20 may rebroadcast the signal by using a different frequency, channel, power, or gain. The relay node 20 may transform or otherwise repackage the data for transmission, while keeping its original meaning. The relay node 20 may transmit data using a different communications protocol than the communications protocol by which it receives data. In other words, the relay node 20 may receive data from a unit 40 on a 5 g carrier wave, and the relay node 20 may retransmit that data to another unit 40 using Wi-Fi.

Figure 6:
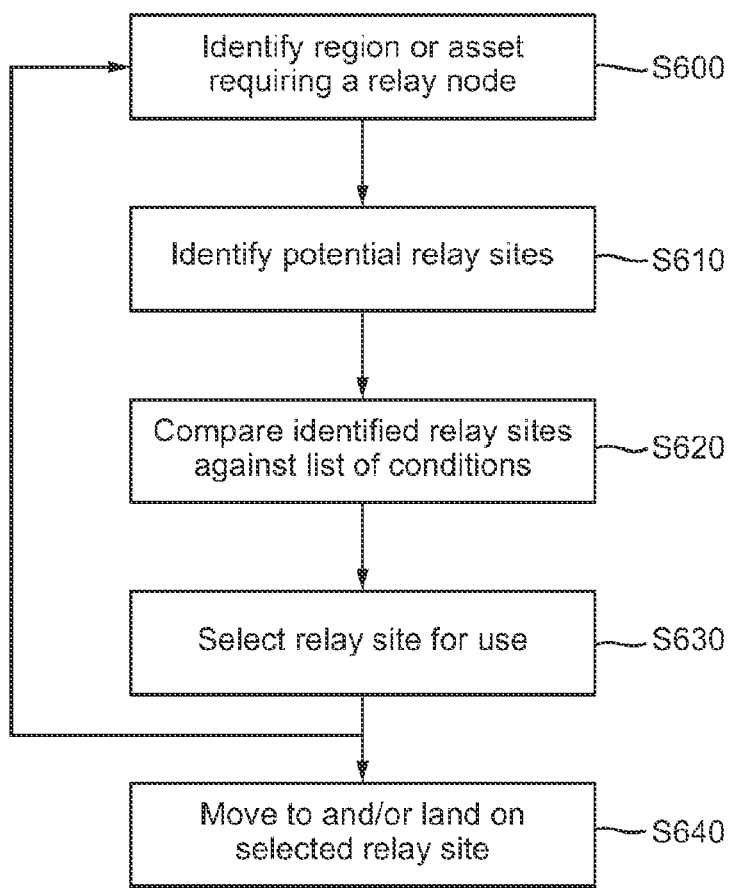
FIG. 6 is a flowchart outlining a method of positioning an unmanned aerial vehicle to optimise a communications network.

The order of the steps illustrated in FIG. 6 is not intended to be limiting. The steps may occur in a different order or simultaneously. For example, in another embodiment, the relay node 20 may move to an identified relay site 30 to perform an RF test to determine its suitability before the relay site 30 is selected for use. The relay node 20 may then select that relay site 30 if it matches the minimum conditions. Alternatively, the relay node 20 may move on to the next identified relay site 30 in turn to perform another RF test. The relay sites 30 may then be compared with each other, once data is gathered on each of them, such that the most optimal relay site 30 can be selected.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. An unmanned vehicle for relaying radio frequency signals in a tactical communications network, the unmanned vehicle comprising:
   a processor arranged to:
      receive a location of a first asset;
      select a relay site from at least one relay site at least based on the location received;
      control the unmanned vehicle to move to the selected relay site;
      generate health data relating to the unmanned vehicle, wherein at the selected relay site, communication between the first asset and the unmanned vehicle is enabled;
   a receiver for receiving data from the first asset and receiving health data related to at least one other unmanned vehicle; and
   a transmitter for transmitting the data to a second asset and transmitting the health data to a control unit, where the processor is configured to control said unmanned vehicle at least based on the received health data.

2. The unmanned vehicle according to claim 1, comprising storage means arranged to store a set of conditions, wherein the processor is configured to receive object data relating to the at least one relay site and compare the object data against the conditions to select the relay site.

3. The unmanned vehicle according to claim 2, comprising an imaging device configured to capture at least one image of the at least one relay site, wherein the received object data relates to the shape, configuration and/or elevation of the at least one relay site.

4. The unmanned vehicle according to claim 1, wherein the processor is configured to calculate or predict a signal strength of a signal comprising the data received from the first asset and/or the second asset at the at least one relay site and to use the calculated or predicted signal strength to select the relay site.

5. The unmanned vehicle according to claim 4, wherein the processor is configured to generate control signals to control the unmanned vehicle to move to the at least one relay site,
   wherein the receiver is arranged to receive a signal from the first asset and/or second asset while the unmanned vehicle is positioned at the at least one relay site; and
   wherein the processor is further configured to analyse the received signals to calculate the received signal strength.

6. The unmanned vehicle according to claim 1, wherein the processor is configured to determine or receive a location of a geographical region, wherein the geographical region comprises the at least one relay site, and wherein the processor is configured to generate a control signal to move the unmanned vehicle to the geographical region.

7. The unmanned vehicle according to claim 6, wherein the processor is configured to measure a signal strength of a signal received from the first asset, while the unmanned vehicle is moving through the geographical region towards the second asset, and select a relay site in a vicinity of a position where the received signal strength drops below a threshold signal strength, or
   wherein the processor is configured to measure a signal strength of a signal received from the second asset, while the unmanned vehicle is moving through the geographical region towards the second asset, and select a relay site in a vicinity of a position where the received signal strength exceeds a threshold signal strength.

8. The unmanned vehicle according to claim 1, wherein the unmanned vehicle is an unmanned aerial vehicle, and wherein moving the unmanned vehicle to the selected relay site comprises landing the unmanned vehicle on the selected relay site.

9. The unmanned vehicle according to claim 8, comprising a securing device configured to, when actuated, grip the selected relay site in order to secure the unmanned vehicle to the selected relay site to facilitate landing.

10. A control unit for an unmanned vehicle for relaying radio frequency signals in a tactical communications network, the control unit comprising:
    a processor configured to:
       determine a location of a first asset and a second asset;
       use the location of the first asset and the second asset to determine a location of a geographical region in which to place a relay to enable communication between the first asset and the second asset;

generate a control signal comprising an instruction to move an unmanned vehicle according to claim 1 to the geographical region; and a transmitter configured to transmit the control signal to the unmanned vehicle.

11. The control unit according to claim 10, wherein the processor is configured to:

retrieve mapping data comprising the elevation of a plurality of relay sites in the geographical region, and select a relay site providing radio frequency line of sight to the first asset and/or the second asset, wherein the control signal comprises an instruction for the unmanned vehicle to move to and/or land on the selected relay site.

12. The control unit according to claim 10, wherein the processor is configured to:

predict a signal strength of a signal received from the first asset and/or second asset while the unmanned vehicle is virtually positioned at each of the relay sites, and select the relay site providing the highest received signal strength, wherein the control signal comprises an instruction for the unmanned vehicle to move to and/or land on the selected relay site.

13. A tactical communications network comprising a plurality of unmanned vehicles according to claim 1, wherein the tactical communications network is a self-healing mesh network comprising a processor configured to determine a respective geographical region for each one of the plurality of unmanned vehicles to move to in order to provide radio frequency line of sight between assets in the network.

14. The unmanned vehicle according to claim 1, wherein the health data include current capabilities of the unmanned vehicle or the at least one other unmanned vehicle.

15. A method of relaying signals in a tactical communications network using an unmanned vehicle, the method comprising:

receiving a location of a first asset;

selecting a relay site from at least one relay site at least based on the location received;

controlling the unmanned vehicle to move to the selected relay site, wherein at the selected relay site, communication between the first asset and the unmanned vehicle is enabled;

generating health data related to the unmanned vehicle;

receiving data from the first asset at a receiver of the unmanned vehicle and receiving health data related to at least one other unmanned vehicle;

transmitting the data to a second asset using a transmitter of the unmanned vehicle, and transmitting the health data generated to a control unit; and controlling said unmanned vehicle at least based on the received health data.

16. The method according to claim 15, comprising storing a set of conditions, receiving object data relating to the at least one relay site and comparing the object data against the conditions to select the relay site.

17. The method according to claim 16, comprising capturing at least one image of the at least one relay site, wherein the received object data relates to the shape, configuration and/or elevation of the at least one relay site.

18. The method according to claim 15, comprising calculating or predicting a signal strength of a signal comprising the data received from the first asset and/or second asset at the at least one relay site and using the calculated or predicted signal strength to select the relay site.

19. The method according to claim 15, comprising:

measuring a signal strength of a signal received from the first asset, while the unmanned vehicle is moving towards the second asset, and selecting a relay site in a vicinity of a position where the received signal strength drops below a threshold signal strength, or measuring a signal strength of a signal received from the second asset, while the unmanned vehicle is moving towards the second asset, and selecting a relay site in a vicinity of a position where the received signal strength exceeds a threshold signal strength.

20. The method according to claim 15, wherein the unmanned vehicle is an unmanned aerial vehicle and wherein moving the unmanned vehicle to a selected relay site comprises landing the unmanned vehicle on the selected relay site.

* * * * *